United States Patent
Suarez Garcia et al.

(10) Patent No.: US 9,357,397 B2
(45) Date of Patent: May 31, 2016

(54) METHODS AND SYSTEMS FOR DETECTING MALWARE AND ATTACKS THAT TARGET BEHAVIORAL SECURITY MECHANISMS OF A MOBILE DEVICE

(71) Applicant: QUALCOMM Incorporated, San Diego, CA (US)

(72) Inventors: Dario Suarez Garcia, Santa Clara, CA (US); Rajarshi Gupta, Sunnyvale, CA (US); Alexander Gantman, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 14/338,838

(22) Filed: Jul. 23, 2014

(65) Prior Publication Data

US 2016/0029221 A1    Jan. 28, 2016

(51) Int. Cl.

| | |
|---|---|
| H04M 1/66 | (2006.01) |
| H04M 3/16 | (2006.01) |
| H04W 12/10 | (2009.01) |
| G06F 21/56 | (2013.01) |
| H04L 29/06 | (2006.01) |
| G06F 21/57 | (2013.01) |
| H04W 12/12 | (2009.01) |
| H04W 24/06 | (2009.01) |

(52) U.S. Cl.
CPC ............. *H04W 12/10* (2013.01); *G06F 21/561* (2013.01); *G06F 21/566* (2013.01); *G06F 21/577* (2013.01); *H04L 63/1416* (2013.01); *H04L 63/1433* (2013.01); *H04W 12/12* (2013.01); *H04W 24/06* (2013.01)

(58) Field of Classification Search
None
See application file for complete search history.

(56) References Cited

U.S. PATENT DOCUMENTS

| | | |
|---|---|---|
| 7,577,424 B2 | 8/2009 | Sinha et al. |
| 7,945,958 B2 | 5/2011 | Amarasinghe et al. |
| 7,958,560 B1 | 6/2011 | Guruswamy |

(Continued)

FOREIGN PATENT DOCUMENTS

| | | |
|---|---|---|
| WO | 2006099536 A2 | 9/2006 |
| WO | 2013172881 A1 | 11/2013 |
| WO | 2014066500 A1 | 5/2014 |

OTHER PUBLICATIONS

International Search Report and Written Opinion—PCT/US2015/039288—ISA/EPO—Sep. 16, 2015.

*Primary Examiner* — Erika A Washington

(74) *Attorney, Agent, or Firm* — The Marbury Law Group, PLLC

(57) ABSTRACT

A behavior-based security system of a computing device may be protected from non-benign behavior, malware, and cyber attacks by configuring the device to work in conjunction with another component (e.g., a server) to monitor the accuracy and performance of the security system, and determine whether the system is working correctly, efficiently, or as expected. This may be accomplished via the server generating artificial attack software, sending the generated artificial attack software to the mobile device to simulate non-benign behavior in the mobile device, such as a cyber attack, and determining whether the behavior-based security system of the mobile device responded adequately to the simulated non-benign behavior. The sever may send a dead-man signal to the mobile device in response to determining that the behavior-based security system of the mobile device did not respond adequately to the simulated non-benign behavior.

26 Claims, 8 Drawing Sheets

(56) References Cited

U.S. PATENT DOCUMENTS

| | | |
|---|---|---|
| 2006/0021048 A1 | 1/2006 | Cook et al. |
| 2007/0142030 A1* | 6/2007 | Sinha ............... H04L 63/1433 455/410 |
| 2007/0174917 A1* | 7/2007 | Guruswamy ....... H04L 63/1433 726/25 |
| 2011/0138470 A1 | 6/2011 | Davis et al. |
| 2012/0137364 A1 | 5/2012 | Blaisdell |
| 2014/0041036 A1 | 2/2014 | Huque et al. |
| 2014/0075203 A1 | 3/2014 | Barbu et al. |

* cited by examiner

METHODS AND SYSTEMS FOR DETECTING MALWARE AND ATTACKS THAT TARGET BEHAVIORAL SECURITY MECHANISMS OF A MOBILE DEVICE

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, mobile devices are quickly becoming the next frontier for malware and cyber attacks. Accordingly, new and improved security solutions that better protect resource-constrained computing devices, such as mobile and wireless devices, will be beneficial to consumers.

SUMMARY

The various aspects include methods of using behavior-based security system to intelligently and efficiently identify, prevent, and/or correct the conditions, factors, and/or behaviors that often degrade a mobile device's performance and/or power utilization levels over time. The various aspects also include methods of analyzing the behavior-based security system of the mobile device, which may include generating artificial attack software configured to simulate a non-benign behavior in a mobile device, sending the generated artificial attack software to the mobile device so as to simulate a non-benign behavior in the mobile device, determining whether the behavior-based security system of the mobile device responded adequately to the simulated non-benign behavior, and sending a dead-man signal to the mobile device in response to determining that the behavior-based security system of the mobile device did not respond adequately to the simulated non-benign behavior.

In an aspect, determining whether the behavior-based security system of the mobile device responded adequately to the simulated non-benign behavior may include receiving behavior information from the mobile device in response to sending the generated artificial attack software to the mobile device, generating a behavior vector based on the received behavior information, applying the generated behavior vector to a classifier model to generate a result, and using the generated result to determine whether the of the behavior-based security system of the mobile device responded adequately to the simulated non-benign behavior.

In a further aspect, the method may include setting a timer by the processor, wherein determining whether the behavior-based security system of the mobile device responded adequately to the simulated non-benign behavior may include determining whether a response was received from the mobile device before an expiration of the timer. In a further aspect, the method may include sending a system-ok signal to the mobile device in response to determining that the behavior-based security system of the mobile device responded adequately to the simulated non-benign behavior.

In a further aspect, sending the dead-man signal to the mobile device may include sending a communication message that includes information suitable for causing the mobile device to perform dead-man operations. In a further aspect, generating the artificial attack software may include receiving a corpus of behavior information from many mobile devices, analyzing the corpus of behavior information to identify a non-benign behavior, and generating the artificial attack software to include information suitable for causing a mobile device processor of the mobile device to perform the identified non-benign behavior. In a further aspect, generating the artificial attack software may include generating artificial attack software that includes information suitable for causing a mobile device processor of the mobile device to perform operations associated with a known cyber attack.

In a further aspect, the method may include receiving the artificial attack software in a processor of the mobile device, installing the received artificial attack software in the mobile device, monitoring operations of the behavior-based security system to collect behavior information, and sending the collected behavior information to the processor. In a further aspect, the method may include setting by the mobile device processor a timer in response to sending the collected behavior information, and performing by the mobile device processor dead-man operations in response to determining that a system-ok signal has not been received by the mobile device and that the timer has expired. In a further aspect, the simulated non-benign behavior may include simulated behaviors of a near-field communication (NFC) transaction, and the dead-man signal may include information suitable for causing the mobile device to prevent completion of an near field communication (NFC) transaction.

Further aspects include a computing device that includes a processor configured with processor-executable instructions to perform various operations, including generating artificial attack software configured to simulate a non-benign behavior in a mobile device, sending the generated artificial attack software to the mobile device so as to simulate the non-benign behavior in the mobile device, determining whether a behavior-based security system of the mobile device responded adequately to the simulated non-benign behavior, and sending a dead-man signal to the mobile device in response to determining that the behavior-based security system of the mobile device did not respond adequately to the simulated non-benign behavior.

In an aspect, the processor may be configured with processor-executable instructions to perform operations such that determining whether the behavior-based security system of the mobile device responded adequately to the simulated non-benign behavior includes receiving behavior information from the mobile device in response to sending the generated artificial attack software to the mobile device, generating a behavior vector based on the received behavior information, applying the generated behavior vector to a classifier model to generate a result, and using the generated result to determine whether the of the behavior-based security system of the mobile device responded adequately to the simulated non-benign behavior. In a further aspect, the processor may be configured with processor-executable instructions to perform operations that include setting a timer by the processor. In an aspect, the processor may be configured with processor-executable instructions to perform operations such that determining whether the behavior-based security system of the mobile device responded adequately to the simulated non-benign behavior includes determining whether a response was received from the mobile device before an expiration of the timer.

In a further aspect, the processor may be configured with processor-executable instructions to perform operations that include sending a system-ok signal to the mobile device in response to determining that the behavior-based security system of the mobile device responded adequately to the simulated non-benign behavior. In a further aspect, the processor may be configured with processor-executable instructions to perform operations such that sending the dead-man signal to the mobile device includes sending a communication message that includes information suitable for causing the mobile device to perform dead-man operations.

In a further aspect, the processor may be configured with processor-executable instructions to perform operations such that generating the artificial attack software includes receiving a corpus of behavior information from many mobile devices, analyzing the corpus of behavior information to identify a non-benign behavior, and generating the artificial attack software to include information suitable for causing a mobile device processor of the mobile device to perform the identified non-benign behavior. In a further aspect, the processor may be configured with processor-executable instructions to perform operations such that generating the artificial attack software includes generating the artificial attack software to include information suitable for causing a mobile device processor of the mobile device to perform operations associated with a known cyber attack.

Further aspects include a non-transitory computer readable storage medium having stored thereon processor-executable software instructions configured to cause a processor to perform operations for analyzing a behavior-based security system of a mobile device, the operations including generating artificial attack software configured to simulate a non-benign behavior in a mobile device, sending the generated artificial attack software to the mobile device so as to simulate a non-benign behavior in the mobile device, determining whether the behavior-based security system of the mobile device responded adequately to the simulated non-benign behavior, and sending a dead-man signal to the mobile device in response to determining that the behavior-based security system of the mobile device did not respond adequately to the simulated non-benign behavior.

In an aspect, the stored processor-executable software instructions may be configured to cause a processor to perform operations such that determining whether the behavior-based security system of the mobile device responded adequately to the simulated non-benign behavior includes receiving behavior information from the mobile device in response to sending the generated artificial attack software to the mobile device, generating a behavior vector based on the received behavior information, applying the generated behavior vector to a classifier model to generate a result, and using the generated result to determine whether the of the behavior-based security system of the mobile device responded adequately to the simulated non-benign behavior.

In a further aspect, the stored processor-executable software instructions may be configured to cause a processor to perform operations that include setting a timer by the processor, wherein determining whether the behavior-based security system of the mobile device responded adequately to the simulated non-benign behavior includes determining whether a response was received from the mobile device before an expiration of the timer. In a further aspect, the stored processor-executable software instructions may be configured to cause a processor to perform operations that include sending a system-ok signal to the mobile device in response to determining that the behavior-based security system of the mobile device responded adequately to the simulated non-benign behavior.

In a further aspect, the stored processor-executable software instructions may be configured to cause a processor to perform operations such that sending the dead-man signal to the mobile device includes sending a communication message that includes information suitable for causing the mobile device to perform dead-man operations. In a further aspect, the stored processor-executable software instructions may be configured to cause a processor to perform operations such that generating the artificial attack software includes receiving a corpus of behavior information from many mobile devices, analyzing the corpus of behavior information to identify a non-benign behavior, and generating the artificial attack software to include information suitable for causing a mobile device processor of the mobile device to perform the identified non-benign behavior. In a further aspect, the stored processor-executable software instructions may be configured to cause a processor to perform operations such that generating the artificial attack software includes generating the artificial attack software to include information suitable for causing a mobile device processor of the mobile device to perform operations associated with a known cyber attack.

Further aspects include a computing device that includes means for generating artificial attack software configured to simulate a non-benign behavior in a mobile device, means for sending the generated artificial attack software to the mobile device so as to simulate a non-benign behavior in the mobile device, means for determining whether the behavior-based security system of the mobile device responded adequately to the simulated non-benign behavior, and means for sending a dead-man signal to the mobile device in response to determining that the behavior-based security system of the mobile device did not respond adequately to the simulated non-benign behavior.

In an aspect, means for determining whether the behavior-based security system of the mobile device responded adequately to the simulated non-benign behavior includes means for receiving behavior information from the mobile device in response to sending the generated artificial attack software to the mobile device, means for generating a behavior vector based on the received behavior information, means for applying the generated behavior vector to a classifier model to generate a result, and means for using the generated result to determine whether the of the behavior-based security system of the mobile device responded adequately to the simulated non-benign behavior. In a further aspect, the computing device includes means for setting a timer by the processor, and the means for determining whether the behavior-based security system of the mobile device responded adequately to the simulated non-benign behavior include means for determining whether a response was received from the mobile device before an expiration of the timer.

In a further aspect, the computing device includes means for sending a system-ok signal to the mobile device in response to determining that the behavior-based security system of the mobile device responded adequately to the simulated non-benign behavior. In a further aspect, means for sending the dead-man signal to the mobile device includes sending a communication message that includes information suitable for causing the mobile device to perform dead-man operations. In a further aspect, means for generating the artificial attack software includes means for receiving a corpus of behavior information from many mobile devices, means for analyzing the corpus of behavior information to identify a non-benign behavior, and means for generating the artificial attack software to include information suitable for causing a mobile device processor of the mobile device to perform the identified non-benign behavior.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
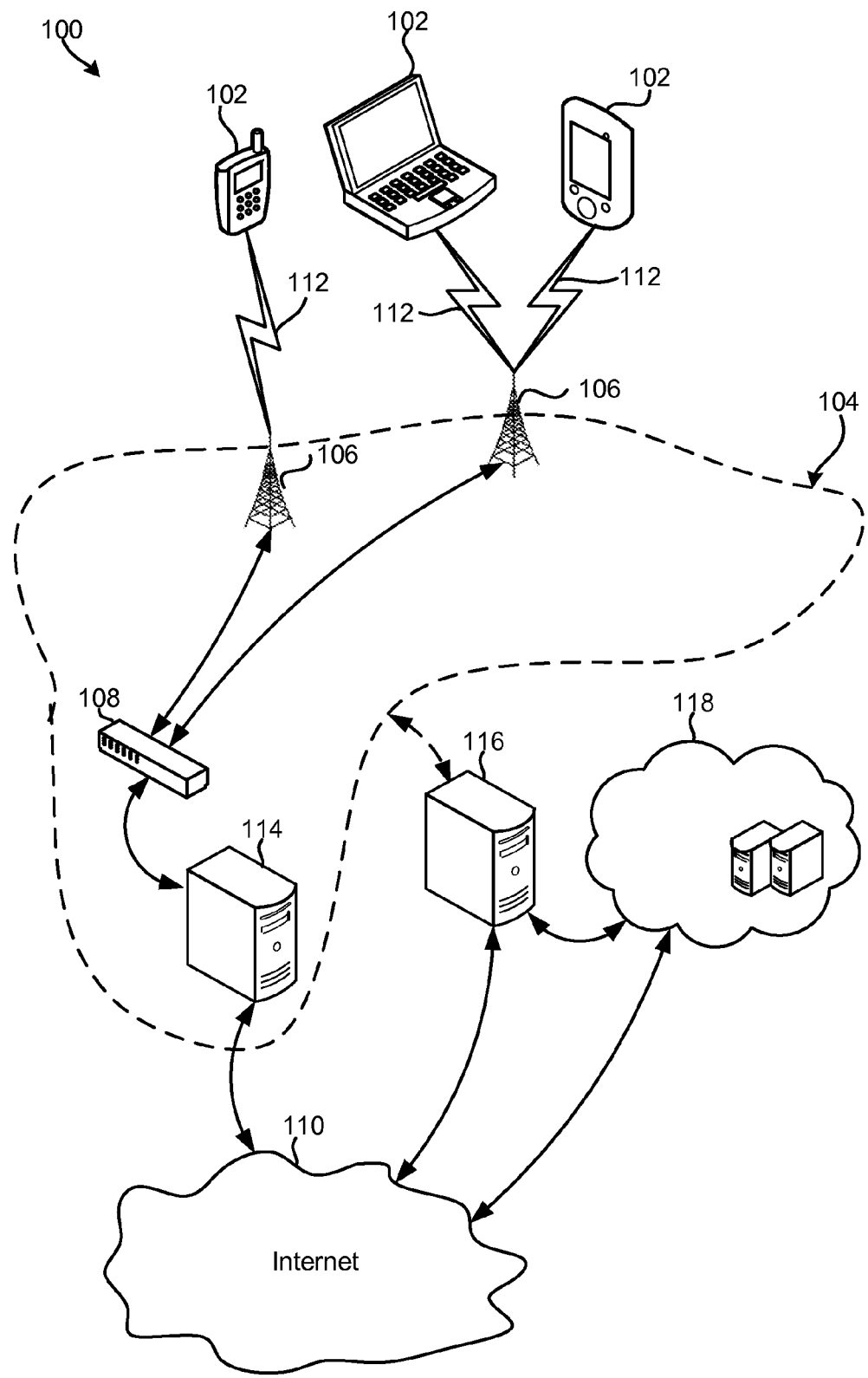
FIG. 1 is a communication system block diagram illustrating network components of an example telecommunication system that is suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and devices configured to implement the methods, for protecting a behavior-based security system of a computing device from malware and cyber attacks and ensuring that the system is working correctly, efficiently, or as expected.

Computing devices (e.g., mobile or other resource-constrained computing devices) may be equipped with a behavior-based security system that is configured to use behavioral analysis and machine learning techniques to intelligently and efficiently identify, prevent, and/or correct the conditions, factors, and/or behaviors that often degrade a computing device's performance and/or power utilization levels over time. For example, the behavior-based security system may use behavioral analysis techniques to quickly and efficiently determine whether a software application, process, activity, or device behavior is benign or non-benign. The behavior-based security system may then cause the computing device to perform various actions or operations to correct, heal, cure, isolate, or otherwise fix the identified problems (e.g., behaviors determined to be non-benign).

While the above-mentioned behavior-based security system is generally very effective for preventing the degradation in performance and power utilization levels of a computing device over time, a malicious software application might attempt to circumvent or evade detection by this system by altering, modifying, suppressing, uninstalling, stopping, or otherwise attacking the behavioral monitoring and analysis system of the device. To prevent such attacks, the various aspects may configure the computing device to work in conjunction with an attack simulation module to monitor the accuracy and performance of the behavior-based security system, and to determine whether the system is working correctly, efficiently, or as expected. In various aspects, the attack simulation module may include software, hardware, or a combination of hardware and software, and may be included in a network server, another computing device, a hypervisor running on the same computing device, or the computing device itself.

In the various aspects, the attack simulation module may be configured to generate and send artificial attack software to a computing device that is equipped with a behavior-based security system ("target device") to simulate an artificial attack in the target device. The target device may be configured to receive and install the artificial attack software, monitor the operations of the behavior-based security system to collect behavior information, and send the collected behavior information to the attack simulation module (or to component or computing device that sent the artificial attack). The attack simulation module may receive and use the behavior information to determine whether the behavior-based security system in the target device correctly or adequately identified and responded to the artificial attack. In an aspect, this may be accomplished by generating behavior vectors based on the behavior information, and applying the behavior vectors to classifier models so as to determine whether the target device responded correctly, efficiently, or as expected to the artificial attack.

In addition to assessing the correct status and operation of the behavior-based security system, attack simulation module may also be configured to collect additional information/metadata on the operations and characteristics of the target device, and use this information to better evaluate the accuracy and performance of the behavior-based security system. For example, the attack simulation module may be configured to cause the target device to track the amount of time and/or energy consumed when evaluating or responding to the artificial attack. The target device may send this information along with the behavior information and/or analysis results (e.g., as part of the same communication, in the same communication message, in a different communication message, etc.) to the attack simulation module, which may receive and use this additional information/metadata to better determine whether the target device responded efficiently or as expected to the artificial attack.

In the various aspects, the attack simulation module may be configured to determine that there has been a disruption to the target device's behavior-based security system in response to determining that the target device did not respond correctly, efficiently, or as expected to the artificial attack. That is, the network server may determine that there is a high probability that the behavior-based security system of the target device has been compromised or improperly modified, has been infected with malware, or is under attack in response to determining that the operations performed in the target device (or the behaviors of the target device) after the installation of the artificial attack software are not consistent with the operations/behaviors expected from a similarly equipped device under similar attack conditions. The attack simulation module may also be configured to determine that there has been a disruption to the target device's behavior-based security system in response to determining that a suitable response was not received within a certain time period after the artificial attack software was sent to the target device.

In an aspect, the attack simulation module may be configured to send or transmit a "dead-man" signal to the target device in response to determining that there has been a disruption to the behavior-based security system of the target device. In an aspect, the dead-man signal may include information suitable for causing the target device to perform dead-man operations, which may include powering off the target device, rebooting the target device, or performing other operations to identify, prevent, and/or correct problems or behaviors of the behavioral monitoring and analysis system in the target device.

In an aspect, the attack simulation module may be configured to send or transmit a "system-OK" signal to the target device in response to determining that the target device's behavior-based security system is functioning normally, correctly, or as expected. In this aspect, the target device may be configured to set a timer for receiving a "system-OK" signal after sending the results of the analysis operations to the network server, and to perform the dead-man operations in response to determining that the timer has expired and a "system-OK" signal has not yet been received from the network server.

The word "exemplary" is used herein to mean "serving as an example, instance, or illustration." Any implementation described herein as "exemplary" is not necessarily to be construed as preferred or advantageous over other implementations.

The term "performance degradation" is used herein to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the device or utilizing the device for spying or botnet activities, etc. Also, behaviors, activities, and conditions that degrade performance for any of these reasons are referred to herein as "not benign" or "non-benign."

The terms "wireless device," "mobile device," "mobile computing device," and "user equipment" may used generically and interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar electronic devices which include a memory, a programmable processor for which performance is important, and operate under battery power such that power conservation methods are of benefit. While the various aspects are particularly useful for mobile devices, which are resource-constrained systems, the aspects are generally useful in any computing device that includes a processor and executes software applications.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

The various aspects overcome these and other limitations of existing solutions by equipping computing devices (e.g., mobile devices) with a behavior-based security system, such as a comprehensive behavioral monitoring and analysis system, that is configured to use machine learning and/or behavioral analysis techniques to intelligently and efficiently identify, prevent, and/or correct the conditions, factors, and/or device behaviors that often degrade a mobile device's performance and/or power utilization levels over time.

In various aspects, the behavioral monitoring and analysis system may include an observer process, daemon, module, or sub-system (herein collectively referred to as a "module"), a behavior extractor module, and an analyzer module. The observer module may be configured to instrument or coordinate various application programming interfaces (APIs), registers, counters or other components (herein collectively "instrumented components") at various levels of the computing device system. The observer module may continuously (or near continuously) monitor activities of the computing device by collecting behavior information from the instrumented components, which may be accomplished by reading information from API log files stored in a memory of the computing device.

The observer module may communicate (e.g., via a memory write operation, function call, etc.) the collected behavior information to the behavior extractor module, which may use the collected behavior information to generate behavior vectors that each represent or characterize many or all of the observed behaviors that are associated with a specific software application, module, component, task, or process of the mobile device. Each behavior vector may encapsulate one or more "behavior features." Each behavior feature may be an abstract number that represents all or a portion of an observed behavior. In addition, each behavior feature may be associated with a data type that identifies a range of possible values, operations that may be performed on those values, meanings of the values, etc. The data type may include information that may be used to determine how the feature (or feature value) should be measured, analyzed, weighted, or used.

The behavior extractor module may communicate (e.g., via a memory write operation, function call, etc.) the generated behavior vectors to the analyzer module. The analyzer module may apply the behavior vectors to classifier models to determine whether a software application or device behavior is benign or non-benign (e.g., malicious, poorly written, performance-degrading, etc.).

A classifier model may be a behavior model that includes data and/or information structures (e.g., feature vectors, behavior vectors, component lists, decision trees, decision nodes, etc.) that may be used by the computing device processor to evaluate a specific feature or aspect of the device's behavior. A classifier model may also include decision criteria for monitoring and/or analyzing a number of features, factors, data points, entries, APIs, states, conditions, behaviors, software applications, processes, operations, components, etc. (herein collectively referred t to as "features") in the computing device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A locally generated lean classifier model is a lean classifier model that is generated in the computing device. As an example, a computing device may be may be configured to receive a full classifier model from a network server, generate a lean classifier model in the computing device based on the full classifier, and use the locally generated lean classifier model to classify a behavior of the device as being either benign or non-benign (i.e., malicious, performance degrading, etc.).

The analyzer module may be configured to notify the observer module in response to determining that a device behavior is suspicious (i.e., in response to determining that the results of the analysis operations are not sufficient to classify the behavior as either benign or non-benign). In response, the observer module may adjust the granularity of its observations (i.e., the level of detail at which computing device features are monitored) and/or change the factors/behaviors that are observed based on information received from the analyzer module (e.g., results of the real-time analysis operations), generate or collect new or additional behavior information, and send the new/additional information to the analyzer module for further analysis. Such feedback communications between the observer and analyzer modules enable the computing device processor to recursively increase the granularity of the observations (i.e., make finer or more detailed observations) or change the features/behaviors that are observed until behavior is classified as either benign or non-benign, until a processing or battery consumption threshold is reached, or until the computing device processor determines that the source of the suspicious or performance-degrading computing device behavior cannot be identified from further increases in observation granularity. Such feedback communication also enable the computing device to adjust or modify the classifier models locally in the computing device without consuming an excessive amount of the computing device's processing, memory, or energy resources.

The above-mentioned behavioral monitoring and analysis system may allow a computing device to identify and react to performance-limiting and undesirable operating conditions without consuming an excessive amount of its processing, memory, or energy resources. This is particularly useful in complex and resource constrained systems, such as mobile computing devices which have relatively limited processing, memory, and energy resources.

In mobile computing devices there are a large variety of factors that may contribute to the degradation in performance and power utilization levels of such devices over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of such problems. As a result, mobile device users have few remedies for preventing the degradation in performance and power utilization levels of a mobile device over time, or for restoring an aging mobile device to its original performance and power utilization levels.

To provide better performance in view of these facts, the mobile device may be equipped with the above-described behavioral monitoring and analysis system so that it may quickly determine whether a particular mobile device behavior, condition, sub-system, software application, or process is benign or not benign without consuming an excessive amount of its processing, memory, or energy resources.

While the above-described behavioral monitoring and analysis system is generally very effective for identifying non-benign behaviors, such as those caused by malware and cyber attacks, the system is itself susceptible to attacks and malware. A malicious software application may circumvent or evade detection by the behavioral monitoring and analysis system by altering, modifying, suppressing, uninstalling, disabling, stopping, or otherwise attacking the various components or modules (e.g., observer, analyzer, etc.) that together provide the comprehensive behavioral monitoring and analysis system. A behavioral monitoring and analysis system might also be compromised by a software update or removal of a software or operating system module that is made without malicious intent.

To identify, prevent, and/or respond to malware, attacks or other events compromising the behavioral monitoring and analysis system, the mobile device may be configured to work in conjunction with a network server (or another computing device, a component in the same computing device, etc.) to monitor the accuracy and performance of the behavioral monitoring and analysis system of the mobile device, and determine whether the system is working correctly, efficiently, or as expected. The network server may be configured to generate and send artificial attack software to the mobile device and listen for a response from the mobile device within an expected response time. If a suitable response is not received from the mobile device within the expected response time, the network server may determine there has been a disruption to that device's behavioral monitoring and analysis system, which may indicate that that the system has been compromised, has been infected with malware, is experiencing an attack, or is otherwise not functioning correctly or as expected.

In response to determining that the behavioral monitoring and analysis system has been compromised, the network server may transmit a "dead-man" signal to the mobile device to cause that device to perform various operations to identify, fix, or respond to problems associated with its behavioral monitoring and analysis system. The "dead-man" signal may also cause the mobile device to send a text message, voice message, email, or other types of notification to the user to notify that user of the attack. If the mobile device includes a service operation system, the "dead-man" signal may also cause the device to capture and send an image or screenshot to the network server for analysis.

The mobile device may be configured to receive and install artificial attack software from the network server (so as to simulate an artificial attack on the mobile device), monitor the operations of the behavioral monitoring and analysis system to collect behavior information and/or analysis results, and send the collected information to the network server (or to the computing device that sent the artificial attack). The network server may use the information received from the mobile device to determine whether the behavioral monitoring and analysis system was able to correctly/adequately identify and respond to the artificial attack. For example, the network server may compare/apply the received information to classifier models to determine whether the mobile device responded correctly, efficiently, or as expected to the artificial attack.

The network server may determine that the mobile device's behavioral monitoring and analysis system has been compromised in response to determining that the system did not respond correctly, efficiently, or as expected to the artificial attack. The network server may transmit a "dead-man" signal configured to cause the mobile device to perform dead-man operations in response to determining that there has been a disruption to the mobile device's behavioral monitoring and analysis system.

In an aspect, the network server may also be configured to transmit a "system-OK" signal to the mobile device in response to determining that the target device's behavioral monitoring and analysis system is functioning normally, correctly, or as expected. In this aspect, the mobile device may be configured to set a timer for receiving a "system-OK" signal after sending the results of the analysis operations to the network server, and to perform the dead-man operations in response to determining that the timer has expired and a "system-OK" signal has not yet been received from the network server.

In various aspects, the network server may be configured to generate the artificial attack software to include executable code or scripts that cause the mobile device to perform various operations associated with known malware and cyber attacks, or operations that are known cause a well-defined reaction in properly functioning behavioral monitoring/analysis systems. In an aspect, the network server may generate artificial attack software so that it simulates behaviors that are associated with a known cyber attack, excluding the operations that are harmful to the mobile device or its user. In another aspect, the network server may be configured to generate artificial attack software so that it simulates a real attack (including harmful operations) or a non-benign behavior. In this aspect, the network server may set a timer for the expected response time so that the dead-man signal is transmitted to the mobile device before the simulated attack causes damage to the device.

In various aspects, the network server may be configured to generate artificial attack software based on information received from an antivirus server, a cloud computing device, and/or another network server. The network server may also generate artificial attack software based on behavior information and/or results of behavior analyses provided by many mobile devices. For example, the network server may crowd source, combine, amalgamate, or correlate the analysis results received from many mobile devices to identify non-benign behaviors, and generate the artificial attack software simulate the identified non-benign behaviors.

In various aspects, the network server may be configured to send artificial attack software to the mobile device repeatedly, periodically, at set intervals, randomly, pseudo-randomly, etc. The network server may be configured to generate many different types of artificial attack software, each of which simulates a different type of attack. The network server may send different type of the artificial attack software to the same mobile device so as to simulate different types of attacks in the same device.

In an aspect, the mobile device may be configured to perform any or all of the above-mentioned operations as part of its normal behavioral monitoring and analysis operations. For example, the mobile device may receive and install the attack software as part of its normal operations for receiving software updates or classifiers from the network server, and report the results of the analysis operations to the network server as part of its regular reporting operations. In another aspect, the mobile device may be equipped with an artificial attack module that is configured to operate independent of the other modules of the comprehensive behavioral monitoring and analysis system. The artificial attack module may be configured to focus its operations on simulating attacks and reporting results to the network server.

In an aspect, the mobile device may be configured to receive the artificial attack software from another mobile device and/or via a peer-to-peer communication link. For example, each of a plurality of mobile devices may be configured to perform behavior observation and analysis operations to identify non-benign behaviors, generate artificial attack software based on one or more of the identified non-benign behaviors, send the generated artificial attack software to the mobile device, set a timer, listen for a response, transmit a dead-man or system-ok signal and/or perform any or all of the operations of the network server discussed above.

In an aspect, mobile devices may be configured to establish or join a trust network that includes a plurality of pre-screened or trusted mobile devices. In various aspects, establishing or joining a trust network may include each mobile device performing group formation operations that include establishing communication links to the other mobile devices another via peer-to-peer, WiFi-Direct, or other similar technologies. Mobile devices may also be connected via a shared secure network, enterprise virtual private network, and other similar technologies or group classifications. In an aspect, a trusted network may include mobile devices that are the same network or which have direct communication links. In an aspect, each mobile device in a trust network may be configured to send and receive artificial attack software, as wells as behavior information and analysis results, to and from any or all of the other mobile devices in that trust network.

In various aspects, the operations discussed above with reference to the network server and/or attack simulation module may instead be performed by the computing device that includes the behavioral monitoring and analysis system being evaluated. For example, the operations of the network server/attack simulation module may be performed by a service or server (or light server) that runs on a hypervisor or virtual machine monitor (VMM) of the computing device that includes the behavioral monitoring and analysis system. As another example, the operations of the network server/attack simulation module may be implemented via software that runs on the same operating system as the behavioral monitoring and analysis system being evaluated. In an aspect, the computing device may also include a hypervisor or VMM that is configured to manage or guarantee the correct behaviors or operations of the service or server that performs the operations discussed above.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network servers 116 and the telephone network 104 may be through the Internet 110 or through a private network (as illustrated by the dashed arrows). A network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

The network server 116 may be configured to receive information on various conditions, features, behaviors, and corrective actions from many mobile devices 102 or a central database or cloud service provider network 118, and use this information to generate data, algorithms, classifiers, or behavior models (herein collectively "classifier models") that include data and/or information structures (e.g., feature vectors, behavior vectors, component lists, etc.) that may be used by a processor of a computing device to evaluate a specific aspect of a mobile device's behavior.

In an aspect, the network server 116 may be configured to send artificial attack software to the mobile device 102, set a response timer, receive a response message from the mobile device 102, determine whether the response message was received before the expiration of the timer, compare the information included in the received response message to one or more classifier models, and use the results of the comparison to determine whether a behavioral monitoring and analysis system of the mobile device 102 correctly identified and responded to the attack. The network server 116 may be configured to transmit a "system-OK" signal to the mobile device in response to determining that response message was received before the expiration of the timer and/or that the information included in the received response message indicates that the mobile device 102 correctly identified and responded to the artificial attack. The network server 116 may also be configured to transmit a "dead-man" signal to the mobile device 102 in response to determining that response message was not received before the expiration of the timer, or that the information included in the received response message indicates that the mobile device 102 did not correctly identify or respond to the artificial attack.

In an aspect, the network server 116 may be configured to generate a full classifier model. The network server 116 may be configured to use the full classifier models to analyze or classify behaviors of the mobile device 102 and/or the behaviors of the behavioral monitoring and analysis system of the mobile device 102. The network server 116 may also be configured to send the full classifier models to the mobile device 102. In an aspect, the network server 116 may be configured to generate the full classifier model to include all or most of the features, data points, and/or factors that could contribute to the degradation of any of a number of different makes, models, and configurations of mobile devices 102. In various aspects, the network server may be configured to generate the full classifier model to describe or express a large corpus of behavior information as a finite state machine, decision nodes, decision trees, or in any information structure that can be modified, culled, augmented, or otherwise used to quickly and efficiently generate leaner classifier models.

The mobile device 102 may be configured to receive and install the artificial attack software, monitor the operations of the behavioral monitoring and analysis system, and send the results of the operations performed by the system back to the network server (or the computing device that sent the artificial attack). The mobile device 102 may also be configured to receive a full classifier model from the network server 116, and use the received full classifier model to monitor, analyze, and/or classify the behaviors of the mobile device 102. The mobile device 102 may be further configured to use the full classifier model to generate more focused classifier models that account for the specific features and functionalities of the software applications of the mobile device 102. For example, the mobile device 102 may generate application-specific and/or application-type-specific classifier models (i.e., data or behavior models) that preferentially or exclusively identify or evaluate the conditions or features of the mobile device that are relevant to a specific software application or to a specific type of software application (e.g., games, navigation, financial, etc.) that is installed on the mobile device 102 or stored in a memory of the mobile device 102. The mobile device 102 may use these locally generated classifier models to perform real-time behavior monitoring and analysis operations.

In various aspects, the network server 116 and/or mobile device 102 may include an attack simulation module, which may be a thread, process, daemon, module, sub-system, or component that is implemented in software, hardware, or a combination thereof. In addition, the attack simulation module may be implemented within parts of the operating system (e.g., within the kernel, in the kernel space, in the user space, etc.), within separate programs or applications, in specialized hardware buffers or processors, or any combination thereof. In an aspect, all or portions of the attack simulation module may be implemented as software instructions executing on one or more processors or processing cores of the mobile device 102 and/or network server 116.

Figure 2:
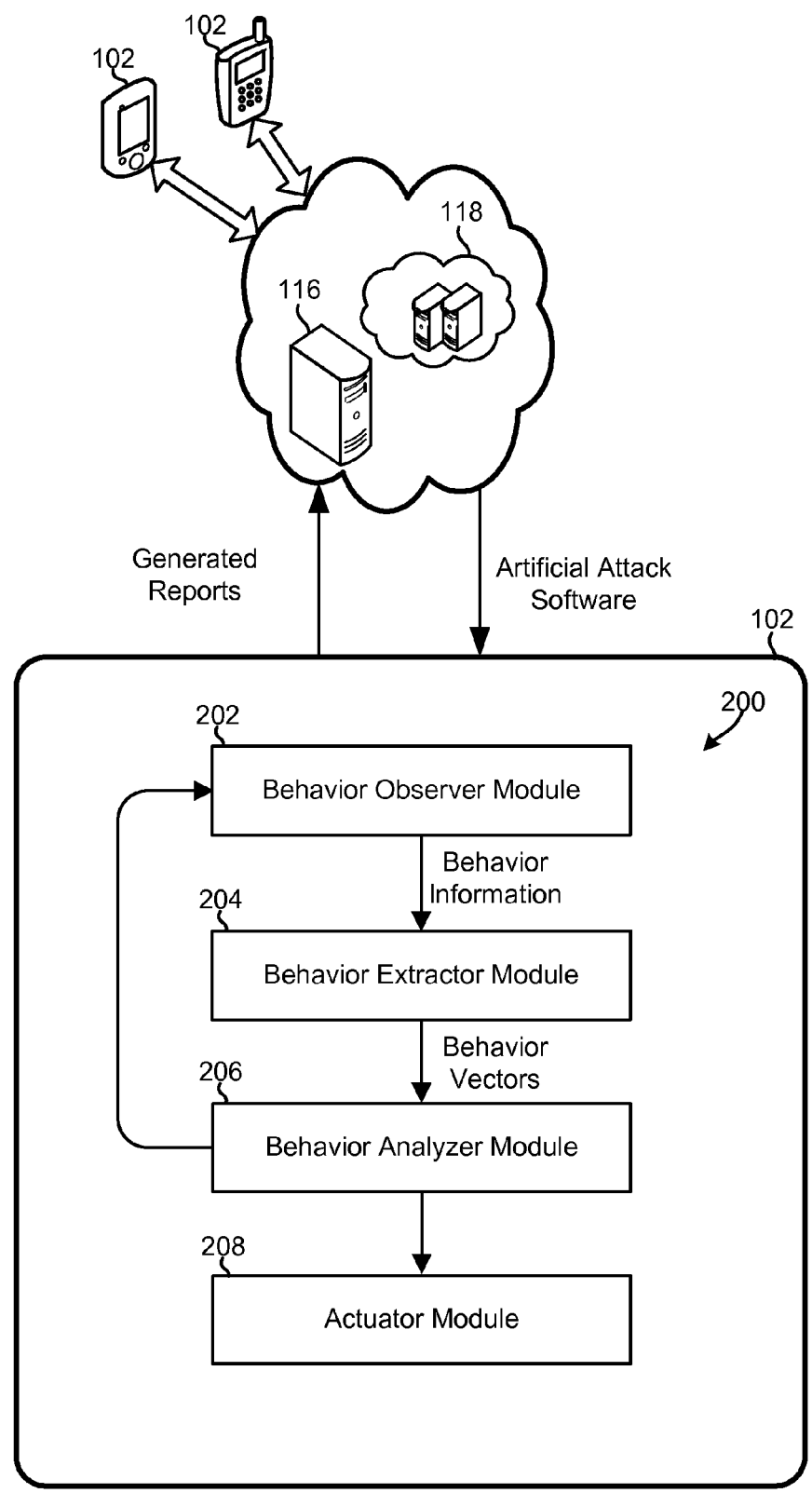
FIG. 2 is a block diagram illustrating example logical components and information flows in an aspect computing device configured to use behavioral analysis and machine learning techniques to classify behaviors as benign or non-benign.

FIG. 2 illustrates example logical components and information flows in an aspect computing device that includes a comprehensive behavioral monitoring and analysis system 200 configured to use behavioral analysis techniques to identify and respond to non-benign device behaviors. In the example illustrated in FIG. 2, the computing device is a mobile device 102 that includes a device processor (i.e., mobile device processor) configured with executable instruction modules that include a behavior observer module 202, a behavior extractor module 204, a behavior analyzer module 206, and an actuator module 208. Each of the modules 202-208 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the mobile device 102.

The device processor may also be configured to receive artificial attack software from a network server 116, install the artificial attack software, monitor the operations, accuracy, and performance of the various modules 202-208 of behavioral monitoring and analysis system 200, generate reports that characterize the operations the system 200 and/or the modules 202-208, and send the generated reports to the network server 116. The device processor may also be configured to set a timer, listen for "system-OK" signal after sending the reports to the network server 116, and perform deadman operations if an "system-OK" signal is not received when the timer expires. In addition, the device processor may be configured listen for a "dead-man" signal indicating that there has been a disruption to the behavioral monitoring and analysis system, and to perform dead-man operations in response to receiving a "dead-man" signal.

The behavior observer module 202 may be configured to instrument application programming interfaces (APIs) at various levels/modules of the device, and monitor the activities, conditions, operations, and events (e.g., system events, state changes, etc.) at the various levels/modules over a period of time via the instrumented APIs. The behavior observer module 202 may collect behavior information pertaining to the monitored activities, conditions, operations, or events, and store the collected information in a memory (e.g., in a log file, etc.). The behavior observer module 202 may then communicate (e.g., via a memory write operation, function call, etc.) the collected behavior information to the behavior extractor module 204.

The behavior extractor module 204 may be configured to receive or retrieve the collected behavior information, and use this information to generate one or more behavior vectors. In an aspect, the behavior extractor module 204 may be configured to generate the behavior vectors to include a concise definition of the observed behaviors. For example, each behavior vector may succinctly describe observed behavior of the mobile device, software application, or process in a value or vector data-structure (e.g., in the form of a string of numbers, etc.). The behavior extractor module 204 may also be configured to generate the behavior vectors so that they function as an identifier that enables the mobile device system (e.g., the behavior analyzer module 206) to quickly recognize, identify, and/or analyze mobile device behaviors.

The behavior analyzer module 206 may be configured to apply the behavior vectors to classifier modules to determine if a device behavior is a non-benign behavior that is contributing to (or are likely to contribute to) the device's degradation over time and/or which may otherwise cause problems on the device. The behavior analyzer module 206 may notify the actuator module 208 that an activity or behavior is not benign. In response, the actuator module 208 may perform various actions or operations to heal, cure, isolate, or otherwise fix identified problems. For example, the actuator module 208 may be configured to terminate a software application or process when the result of applying the behavior vector to the classifier model (e.g., by the analyzer module) indicates that a software application or process is not benign.

The behavior observer module 202 may be configured to monitor the activities of the mobile computing device 102. In various aspects, this may be accomplishing by monitoring various software and hardware components of the mobile computing device 102 and collecting information pertaining to the communications, transactions, events, or operations of the monitored and measurable components that are associated with the activities of the mobile computing device 102. Such activities include a software application's performance of an operation or task, a software application's execution in a processing core of the mobile computing device 102, the execution of process, the performance of a task or operation, a device behavior, the use of a hardware component, etc.

In various aspects, the behavior observer module 202 may be configured to monitor the activities of the mobile computing device 102 by collecting information pertaining to library API calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's degradation. In an aspect, the behavior observer module 202 may receive the initial set of behaviors and/or factors from a server and/or a component in a cloud service or network. In an aspect, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign.

A locally generated lean classifier model is a lean classifier model that is generated in the computing device. An application-specific classifier model is a classifier model that includes a focused data model that includes/tests only the features/entries that are most relevant for evaluating a particular software application. A device-specific classifier model is a classifier model that includes a focused data model that includes/tests only computing device-specific features/entries that are determined to be most relevant to classifying an activity or behavior in a specific computing device.

The behavior analyzer module 206 may be configured to apply the behavior vectors generated by the behavior extractor module 204 to a classifier model to determine whether a monitored activity (or behavior) is benign, suspicious, or non-benign. In an aspect, the behavior analyzer module 206 may classify a behaviors as "suspicious" when the results of its behavioral analysis operations do not provide sufficient information to classify the behavior as either benign or non-benign.

The behavior analyzer module 206 may be configured to notify the behavior observer module 202 in response to determining that a monitored activity or behavior is suspicious. In response, the behavior observer module 202 may adjust the granularity of its observations (i.e., the level of detail at which computing device features are monitored) and/or change the factors/behaviors that are observed based on information received from the behavior analyzer module 206 (e.g., results of the real-time analysis operations), generate or collect new or additional behavior information, and send the new/additional information to the behavior analyzer module 206 for further analysis/classification. Such feedback communications between the behavior observer module 202 and the behavior analyzer module 206 enable the mobile computing device 102 to recursively increase the granularity of the observations (i.e., make finer or more detailed observations) or change the features/behaviors that are observed until an activity is classified, a source of a suspicious or performance-degrading computing device behavior is identified, until a processing or battery consumption threshold is reached, or until the computing device processor determines that the source of the suspicious or performance-degrading computing device behavior cannot be identified from further increases in observation granularity. Such feedback communication also enable the mobile computing device 102 to adjust or modify the classifier models locally in the computing device without consuming an excessive amount of the computing device's processing, memory, or energy resources.

In an aspect, the behavior observer module 202 and the behavior analyzer module 206 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the mobile computing device 102 to efficiently identify and prevent problems without requiring a large amount of processor, memory, or battery resources on the device.

In various aspects, the device processor may be configured to monitor, analyze, and/or classify activities or behaviors by identifying a critical data resource that requires close monitoring, identifying an intermediate resource associated with the critical data resource, monitoring API calls made by a software application when accessing the critical data resource and the intermediate resource, identifying computing device resources that are consumed or produced by the API calls, identifying a pattern of API calls as being indicative of non-benign activity by the software application, generating a light-weight behavior signature based on the identified pattern of API calls and the identified computing device resources, using the light-weight behavior signature to perform behavior analysis operations, and determining whether the software application is benign or not benign based on the behavior analysis operations.

In various aspects, the device processor may be configured to monitor, analyze, and/or classify activities or behaviors by identifying APIs that are used most frequently by software applications executing on the computing device, storing information regarding usage of identified hot APIs in an API log in a memory of the computing device, and performing behavior analysis operations based on the information stored in the API log to identify behaviors that are inconsistent with normal operation patterns. In an aspect, the API log may be generated so that it is organized such that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various aspects, the device processor may be configured to monitor, analyze, and/or classify activities or behaviors by receiving from a server a full classifier model that includes a finite state machine that is suitable for conversion or expression as a plurality of boosted decision stumps, generating a lean classifier model in the computing device based on the full classifier, and using the lean classifier model in the computing device to classify the activities or behaviors as being either benign or not benign (i.e., malicious, performance degrading, etc.). In an aspect, generating the lean classifier model based on the full classifier model may include determining a number of unique test conditions that should be evaluated to classify an activity or behavior without consuming an excessive amount of processing, memory, or energy resources of the computing device, generating a list of test conditions by sequentially traversing the list of boosted decision stumps and inserting the test condition associated with each sequentially traversed boosted decision stump into the list of test conditions until the list of test conditions includes the determined number of unique test conditions, and generating the lean classifier model to include only those boosted decision stumps that test one of a plurality of test conditions included in the generated list of test conditions.

In various aspects, the device processor may be configured to monitor, analyze, and/or classify activities or behaviors by using device-specific information, such as capability and state information, of the computing device to identify device-specific test conditions in a plurality of test conditions that are relevant to classifying a behavior of the computing device, generating a lean classifier model that includes only the identified computing device-specific test conditions, and using the generated lean classifier model in the computing device to classify the behavior of the computing device. In an aspect, the lean classifier model may be generated to include only decision nodes that evaluate a computing device feature that is relevant to a current operating state or configuration of the computing device. In an aspect, generating the lean classifier model may include determining a number of unique test conditions that should be evaluated to classify the behavior without consuming an excessive amount of computing device's resources (e.g., processing, memory, or energy resources), generating a list of test conditions by sequentially traversing the plurality of test conditions in the full classifier model, inserting those test conditions that are relevant to classifying the behavior of the computing device into the list of test conditions until the list of test conditions includes the determined number of unique test conditions, and generating the lean classifier model to include decision nodes included in the full classifier model that test one of the conditions included in the generated list of test conditions.

In various aspects, the device processor may be configured to monitor, analyze, and/or classify activities or behaviors by monitoring an activity of a software application or process, determining an operating system execution state of the software application/process, and determining whether the activity is a critical activity based the operating system execution state of the software application or process during which the activity was monitored. In an further aspect, the device processor may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is a critical activity and/or not benign.

In various aspects, the device processor may be configured to monitor, analyze, and/or classify activities or behaviors by monitoring an activity of a software application or process, determining an application-and-operating-system-agnostic execution state of the software application/process, and determining whether the activity is a critical activity or not benign based on the activity and/or the application-and-operating-system-agnostic execution state of the software application during which the activity was monitored. In an further aspect, the device processor may determine whether the application-and-operating-system-agnostic execution state of the software application is relevant to the activity, and generate a behavior vector that associates the activity with the application-and-operating-system-agnostic execution state, and use the behavior vector to determine whether the activity is a critical activity and/or not benign. The device processor may also use the application-and-operating-system-agnostic execution state to select a classifier model (e.g., application-specific classifier model), and apply the behavior vector to the selected classifier model to determine whether the activity is a critical activity and/or not benign.

In the various aspects, the device processor may be configured to work in conjunction with a network server to intelligently and efficiently identify the features, factors, and data points that are most relevant to determining whether an activity is a critical activity and/or not benign. For example, the device processor may be configured to receive a full classifier model from the network server, and use the received full classifier model to generate lean classifier models (i.e., data/behavior models) that are specific for the features and functionalities of the computing device or the software applications of the computing device. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the device processor may be configured to generate one or more lean classifier models by converting a finite state machine representation/expression into boosted decision stumps, pruning or culling the full set of boosted decision stumps based on computing device-specific states, features, behaviors, conditions, or configurations to include subset or subsets of boosted decision stumps included in the full classifier model, and using the subset or subsets of boosted decision stumps to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an aspect, the device processor may be configured to generate a lean classifier model that includes a subset of classifier criteria included in the full classifier model and only those classifier criteria corresponding to the features relevant to the computing device configuration, functionality, and connected/included hardware. The device processor may use this lean classifier model(s) to monitor only those features and functions present or relevant to the device. The device processor may then periodically modify or regenerate the lean classifier model(s) to include or remove various features and corresponding classifier criteria based on the computing device's current state and configuration.

As an example, the device processor may be configured to receive a large boosted-decision-stumps classifier model that includes decision stumps associated with a full feature set of behavior models (e.g., classifiers), and derive one or more lean classifier models from the large classifier models by selecting only features from the large classifier model(s) that are relevant the computing device's current configuration, functionality, operating state and/or connected/included hardware, and including in the lean classifier model a subset of boosted decision stumps that correspond to the selected features. In this aspect, the classifier criteria corresponding to features relevant to the computing device may be those boosted decision stumps included in the large classifier model that test at least one of the selected features. The device processor may then periodically modify or regenerate the boosted decision stumps lean classifier model(s) to include or remove various features based on the computing device's current state and configuration so that the lean classifier model continues to include application-specific or device-specific feature boosted decision stumps.

In addition, the device processor may also dynamically generate application-specific classifier models that identify conditions or features that are relevant to a specific software application (Google® wallet) and/or to a specific type of software application (e.g., games, navigation, financial, news, productivity, etc.). In an aspect, these classifier models may be generated to include a reduced and more focused subset of the decision nodes that are included in the full classifier model or of those included in lean classifier model generated from the received full classifier model.

In various aspects, the device processor may be configured to generate application-based classifier models for each software application in the system and/or for each type of software application in the system. The device processor may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various aspects, device processor may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various aspects, the device processor may be configured to use information identifying the actual execution states in which certain tasks/activities are performed to focus its behavioral monitoring and analysis operations, and better determine whether an activity is a critical activity and/or whether the activity is not benign.

In various aspects, the device processor may be configured to associate the activities/tasks performed by a software application with the execution states in which those activities/tasks were performed. For example, the device processor may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an aspect, this sub-vector/data-structure may be stored in association with a shadow feature value sub-vector/data-structure that identifies the execution state in which each feature/activity/operation was observed. As an example, the device processor may generate a behavior vector that includes a "location_background" data field whose value identifies the number or rate that the software application accessed location information when it was operating in a background state. This allows the device processor to analyze this execution state information independent of and/or in parallel with the other observed/monitored activities of the computing device. Generating the behavior vector in this manner also allows the system to aggregate information (e.g., frequency or rate) over time.

In various aspects, the device processor may be configured to generate the behavior vectors to include information that may be input to a decision node in the machine learning classifier to generate an answer to a query regarding the monitored activity.

In various aspects, the device processor may be configured to generate the behavior vectors to include a concise definition of the observed/monitored behaviors. The behavior vector may succinctly describe an observed behavior of the computing device, software application, or process in a value or vector data-structure (e.g., in the form of a string of numbers, etc.). The behavior vector may also function as an identifier that enables the computing device system to quickly recognize, identify, and/or analyze computing device behaviors.

In various aspects, the device processor may be configured to generate the behavior vectors to include a plurality or series of numbers, each of which signifies or characterizes a feature, activity, or a behavior of the mobile computing device 102. For example, numbers included in the behavior vector may signify whether a camera of the computing device is in use (e.g., as zero or one), how much network traffic has been transmitted from or generated by the computing device (e.g., 20 KB/sec, etc.), how many internet messages have been communicated (e.g., number of SMS messages, etc.), etc. In an aspect, the behavior vector may encapsulate one or more "behavior features." Each behavior feature may be an abstract number that represents all or a portion of an observed behavior or action. The behavior features may be agnostic to the hardware or software configuration of the computing device.

In various aspects, the device processor may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

Figure 3:
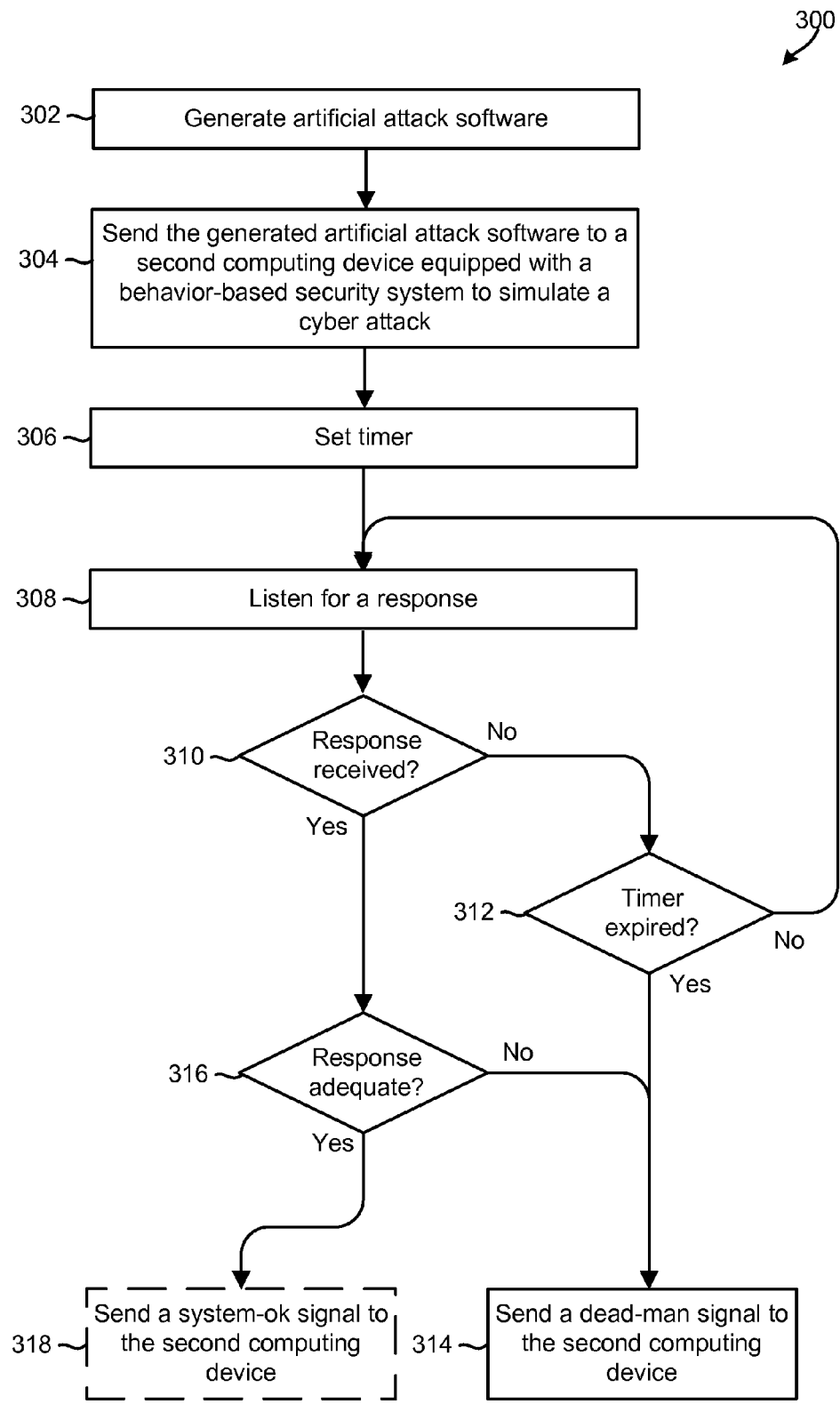
FIGS. 3 and 4 are process flow diagram illustrating methods of evaluating the accuracy and performance of a behavior-based security system of a computing device in accordance with the various aspects.

FIG. 3 illustrates a method 300 of analyzing a behavior-based security system of a computing device in accordance with an aspect. In an aspect, the behavior-based security system may be the comprehensive behavioral monitoring and analysis system discussed above (e.g., with reference to FIG. 2). In various aspects, method 300 may be performed by a processor or processing core of a computing device (e.g., network server, mobile device, etc.).

In block 302, a processing core of a computing device may generate artificial attack software. In block 304, the processing core may send the generated artificial attack software to a second computing device equipped with a behavior-based security system so as to simulate a cyber attack. In block 306, the processing core may set a timer. In block 308, the processing core may listen for a response from the second computing device. In determination blocks 310 and 312, the processing core may determine whether a response has been received from the second computing device and whether the timer has expired. In the example illustrated in FIG. 3, the processing core determines whether the timer has expired in determination block 312 in response to determining that a response has not yet been received from the second computing device (i.e., determination block 310="No"). In another aspect, the processing core may first determine that the timer has expired before determining whether a response has been received.

In response to determining that a response has not yet been received from the second computing device (i.e., determination block 310="No") and the timer has not yet expired (i.e., determination block 312="No"), the processing core may continue listening for a response in block 308. In response to determining that the timer has expired (i.e., determination block 312="No"), the processing core may send a dead man signal to the second computing device in block 314.

In response to determining that a response has been received from the second computing device (i.e., determination block 310="Yes"), in determination block 316, the processing core may determine whether the response is adequate by determining whether the second computing device correctly or adequately identified and responded to the simulated cyber attack or non-benign behavior. In response to determining that the second computing device did not correctly/adequately identify or respond to the simulated cyber attack (i.e., determination block 316="No"), the processing core may send a dead-man signal to the second computing device in block 314. In response to determining that the second computing device correctly/adequately identified and responded to the simulated cyber attack or non-benign behavior (i.e., determination block 316="Yes"), in optional block 318, the processing core may send a "system-ok" signal to the second computing device.

Figure 4:
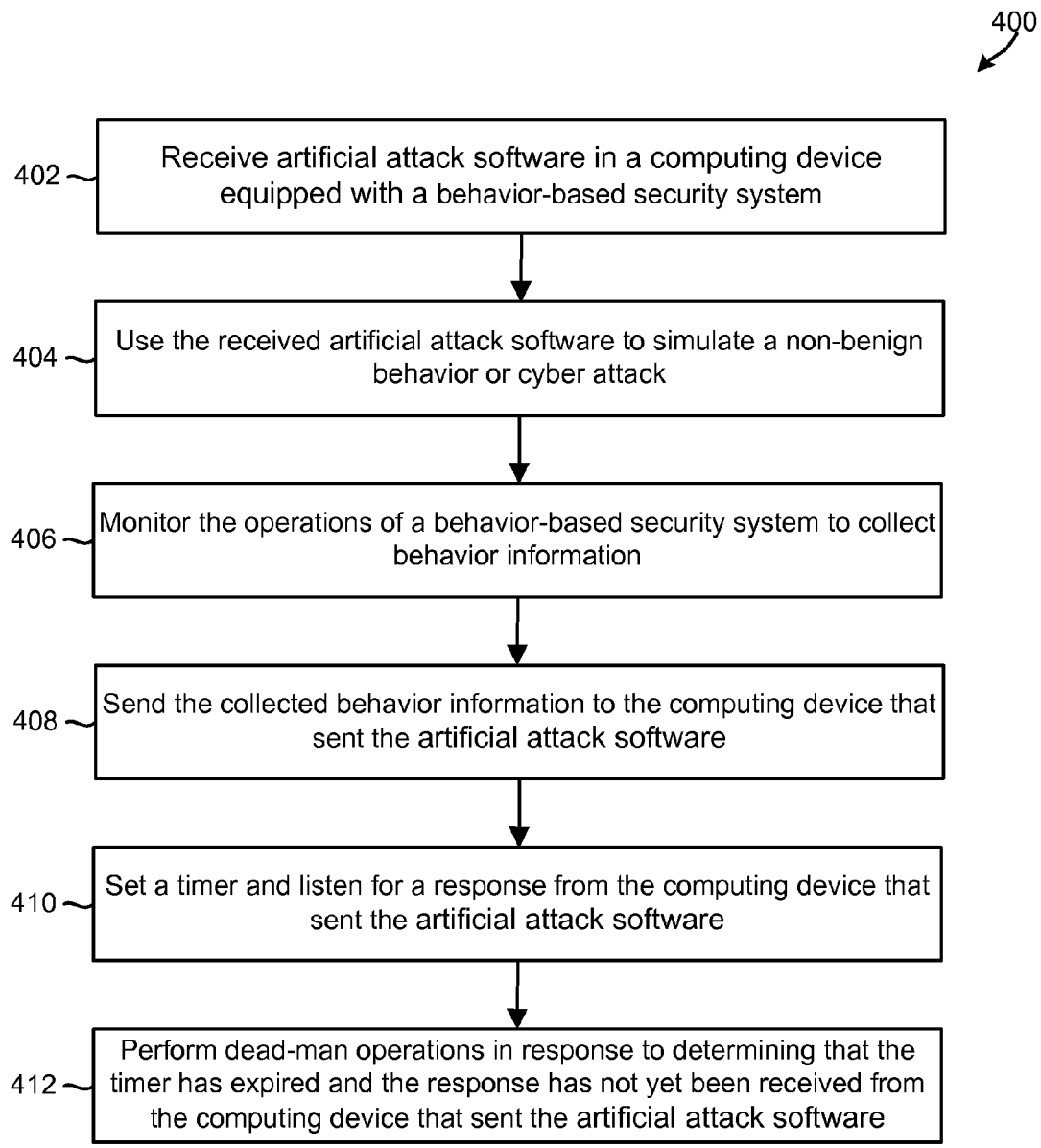

FIG. 4 illustrates a method 400 of evaluating a behavior-based security system of a computing device in accordance with an aspect. The behavior-based security system may be a comprehensive behavioral monitoring and analysis system of a mobile or resource constrained computing device. In an aspect, method 400 may be performed by a processing core of a mobile computing device.

In block 402, the processing core may receive artificial attack software from another computing device (e.g., network server, another mobile device, etc.). In block 404, the processing core may use the received artificial attack software to simulate a cyber attack or non-benign behavior in the mobile device. In block 406, the processing core may monitor the operations of a behavior-based security system of the mobile device to collect behavior information. In block 408, the processing core may send the collected behavior information to the computing device that sent the artificial attack software. In block 410, the processing core may set a timer and listen for a response from the computing device that sent the artificial attack software. In block 412, the processing core may perform dead-man operations in response to determining that the timer has expired and the response has not yet been received from the computing device that sent the artificial attack software.

Figure 5:
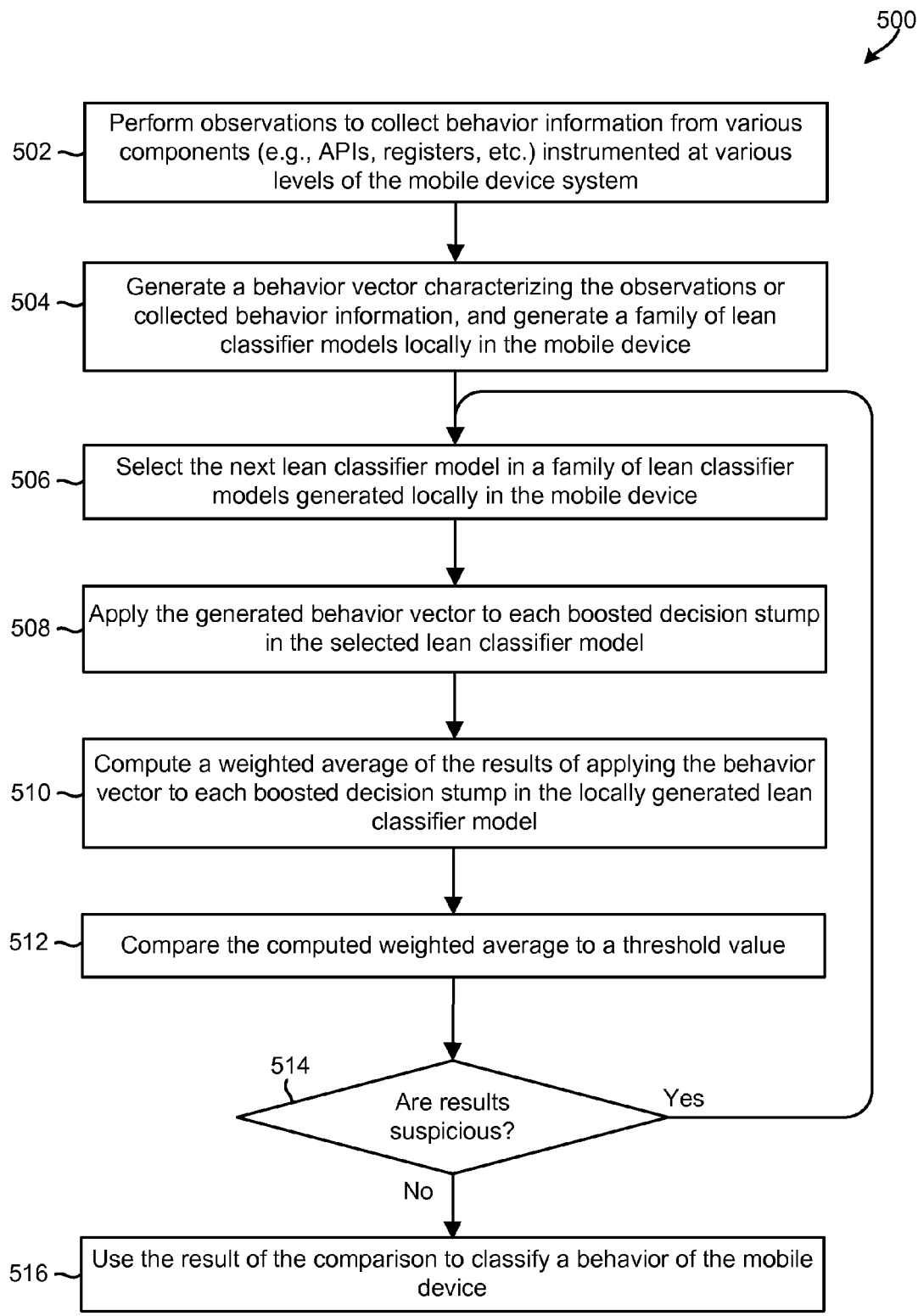
FIG. 5 is a process flow diagram illustrating a method of generating classifier models that are suitable for use in classifying device behaviors in accordance with the various aspects.

FIG. 5 illustrates an aspect method 500 of using a lean classifier model to classify a behavior of the mobile device. Method 500 may be performed by a processing core in a mobile device.

In block 502, the processing core my perform observations to collect behavior information from various components that are instrumented at various levels of the mobile device system. In an aspect, this may be accomplished via the behavior observer module 202 discussed above with reference to FIG. 2. In block 504, the processing core may generate a behavior vector characterizing the observations, the collected behavior information, and/or a mobile device behavior. Also in block 504, the processing core may use a full classifier model received from a network server to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 506, the processing core may select the leanest classifier in the family of lean classifier models (i.e., the model based on the fewest number of different mobile device states, features, behaviors, or conditions) that has not yet been evaluated or applied by the mobile device. In an aspect, this may be accomplished by the processing core selecting the first classifier model in an ordered list of classifier models.

In block 508, the processing core may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector applied in block 530 may be truncated or filtered to just include the limited number of test condition parameters included in the lean classifier model, thereby further reducing the computational effort in applying the model.

In block 510, the processing core may compute or determine a weighted average of the results of applying the collected behavior information to each boosted decision stump in the lean classifier model. In block 512, the processing core may compare the computed weighted average to a threshold value. In determination block 514, the processing core may determine whether the results of this comparison and/or the results generated by applying the selected lean classifier model are suspicious. For example, the processing core may determine whether these results may be used to classify a behavior as either malicious or benign with a high degree of confidence, and if not treat the behavior as suspicious.

If the processing core determines that the results are suspicious (e.g., determination block 514="Yes"), the processing core may repeat the operations in blocks 506-512 to select and apply a stronger (i.e., less lean) classifier model that evaluates more device states, features, behaviors, or conditions until the behavior is classified as malicious or benign with a high degree of confidence. If the processing core determines that the results are not suspicious (e.g., determination block 514="No"), such as by determining that the behavior can be classified as either benign or non-benign with a high degree of confidence, in block 516, the processing core may use the result of the comparison generated in block 512 to classify a behavior of the mobile device as benign, non-benign or potentially malicious.

In an alternative aspect method, the operations described above may be accomplished by sequentially selecting a boosted decision stump that is not already in the lean classifier model; identifying all other boosted decision stumps that depend upon the same mobile device state, feature, behavior, or condition as the selected decision stump (and thus can be applied based upon one determination result); including in the lean classifier model the selected and all identified other boosted decision stumps that that depend upon the same mobile device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 6:
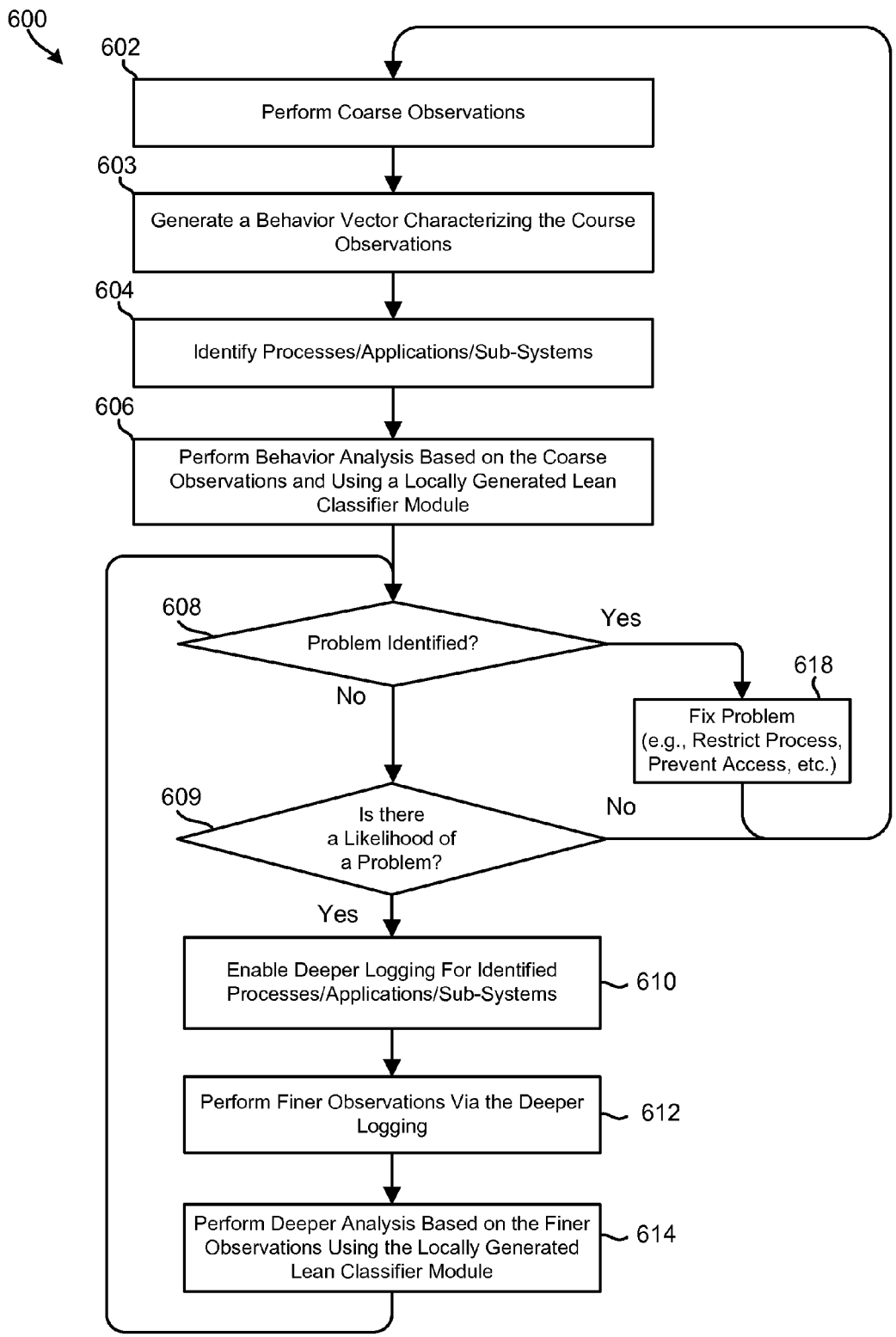
FIG. 6 is a process flow diagram illustrating a method for performing behavioral monitoring and analysis operations in accordance with an aspect.

FIG. 6 illustrates an example method 600 for performing dynamic and adaptive observations in accordance with an aspect. In block 602, the device processor may perform coarse observations by monitoring/observing a subset of a large number factors/behaviors that could contribute to the mobile device's degradation. In block 603, the device processor may generate a behavior vector characterizing the coarse observations and/or the mobile device behavior based on the coarse observations. In block 604, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the device processor may perform behavioral analysis operations based on the coarse observations. In an aspect, as part of blocks 603 and 604, the device processor may perform one or more of the operations discussed above with reference to FIGS. 2-10.

In determination block 608, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

When the device processor determines that the suspicious behaviors or potential problems cannot be identified and/or corrected based on the results of the behavioral analysis (i.e., determination block 608="No"), in determination block 609 the device processor may determine whether there is a likelihood of a problem. In an aspect, the device processor may determine that there is a likelihood of a problem by computing a probability of the mobile device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

When the device processor determines that there is a likelihood that suspicious behaviors or potential problems exist and/or are detectable (i.e., determination block 609="Yes"), the device processor may perform deeper logging/observations or final logging on the identified subsystems, processes or applications in block 610. In block 612, the device processor may perform deeper and more detailed observations on the identified subsystems, processes or applications. In block 614, the device processor may perform further and/or deeper behavioral analysis based on the deeper and more detailed observations.

In determination block 608, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 608="Yes"), in block 618, the device processor may perform operations to correct the problem/behavior, and the processor may return to block 602 to perform additional operations.

In an aspect, as part of blocks 602-618 of method 600, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

In the various aspects, a processor or processing core (collectively "processor") may be configured to perform operations for analyzing a behavior-based security system of a target computing device. The behavior-based security system may be a comprehensive behavioral monitoring and analysis system, such as the system 200 discussed above with reference to FIG. 2. In various aspects, the processor may be included in the target computing device or in a different computing device as the target computing device.

In an aspect, the operations may be performed by an attack simulation module operating on the processor. The attack simulation module may be configured to run on the same operating system as the behavior-based security system or on a hypervisor of the target computing device. In an aspect, the target computing device may include or configured in software instructions to execute a hypervisor that is configured to monitor, control, or evaluate the operations of the attack simulation module. This allows the attack simulation module to operate on the same operating system as the behavior-based security system because the hypervisor helps ensure that the attack simulation module does not become vulnerable to the same types of attacks or problems as the behavior-based security system.

As mentioned above, a processor may be configured to perform operations for analyzing a behavior-based security system of a target computing device. As part of these operations, the processor may generate artificial attack software. The artificial attack software may include executable code, scripts, or other information suitable for simulating a non-benign behavior in the target computing device (i.e., the same or different computing device that includes the behavior-based security system being evaluated). That is, the processor may be configured to generate the artificial attack software to include information that is suitable for simulating a non-benign behavior in the target computing device.

For example, in an aspect, the processor may be configured to receive a corpus of behavior information from many computing devices (e.g., mobile devices, etc.), analyze the corpus of behavior information to identify a non-benign behavior, and generating the artificial attack software to include information suitable for causing a processor to perform operations associated with the identified non-benign behavior. As another example, the processor may generate the artificial attack software to include information suitable for causing a processor to perform operations that are associated with a known cyber attack.

The processor may be configured to send the generated artificial attack software to a target computing device (e.g., via communication messages, function calls, memory read/write operations, etc.) to cause the target computing device to perform operations associated with a known/identified non-benign behavior. In response, the processor may receive behavior information from the target computing device, generate a behavior vector based on the received behavior information, apply the generated behavior vector to a classifier model to generate a result, and use the generated result to determine whether the behavior-based security system responded adequately to the simulated non-benign behavior. In addition, the processor may be configured determine whether the behavior-based security system responded adequately to the simulated non-benign behavior by determining whether a response was received within a defined time period, such as before expiration of a timer.

The processor may be configured to send a dead-man signal to the target computing device in response to determining that the behavior-based security system did not respond adequately to the simulated non-benign behavior. Sending a dead-man signal may include sending a communication message that includes information suitable for causing the mobile device to perform one or more dead-man operations, such as operations for preventing the completion of an NFC-based transaction by the target computing device.

In an aspect, the target computing device may be configured to receive artificial attack software, install the received artificial attack software, monitor operations of the behavior-based security system to collect behavior information, and send the collected behavior information to the processor. The target computing device may set a timer in response to sending the collected behavior information, and perform dead-man operations in response to determining that a system-ok signal was not received by the mobile device before an expiration of a timer.

Figure 7:
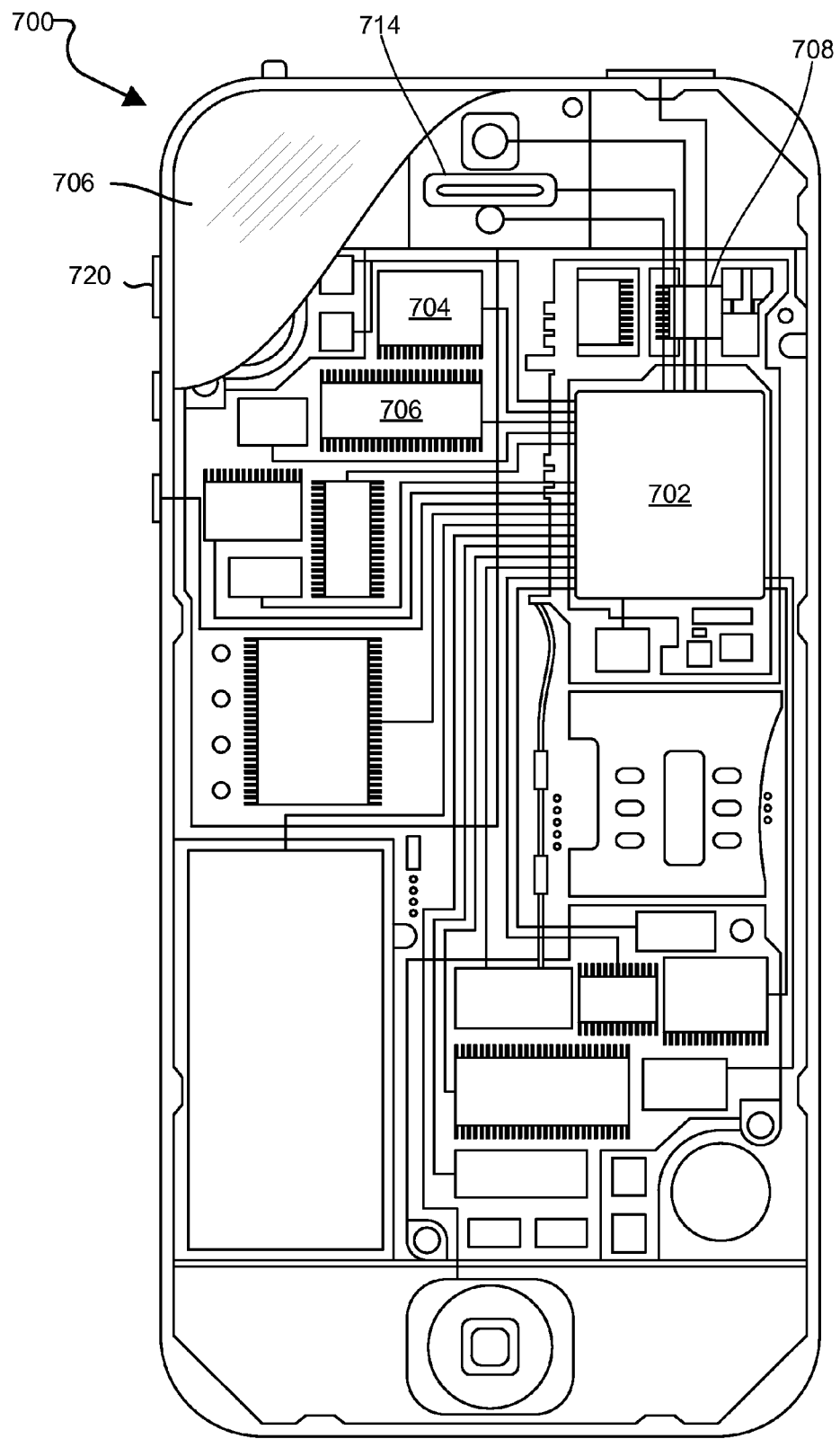
FIG. 7 is a component block diagram of a mobile device suitable for use in an aspect.

The various aspects may be implemented on a variety of computing devices, an example of which is illustrated in FIG. 7. Specifically, FIG. 7 is a system block diagram of a mobile computing device in the form of a smartphone/cell phone 700 suitable for use with any of the aspects. The cell phone 700 may include a processor 702 coupled to internal memory 704, a display 706, and to a speaker 708. Additionally, the cell phone 700 may include an antenna 710 for sending and receiving electromagnetic radiation that may be connected to a wireless data link and/or cellular telephone transceiver 712 coupled to the processor 702. Cell phones 700 typically also include menu selection buttons or rocker switches 714 for receiving user inputs.

A typical cell phone 700 also includes a sound encoding/decoding (CODEC) circuit 716 that digitizes sound received from a microphone into data packets suitable for wireless transmission and decodes received sound data packets to generate analog signals that are provided to the speaker 708 to generate sound. Also, one or more of the processor 702, wireless transceiver 712 and CODEC 716 may include a digital signal processor (DSP) circuit (not shown separately). The cell phone 700 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 8:
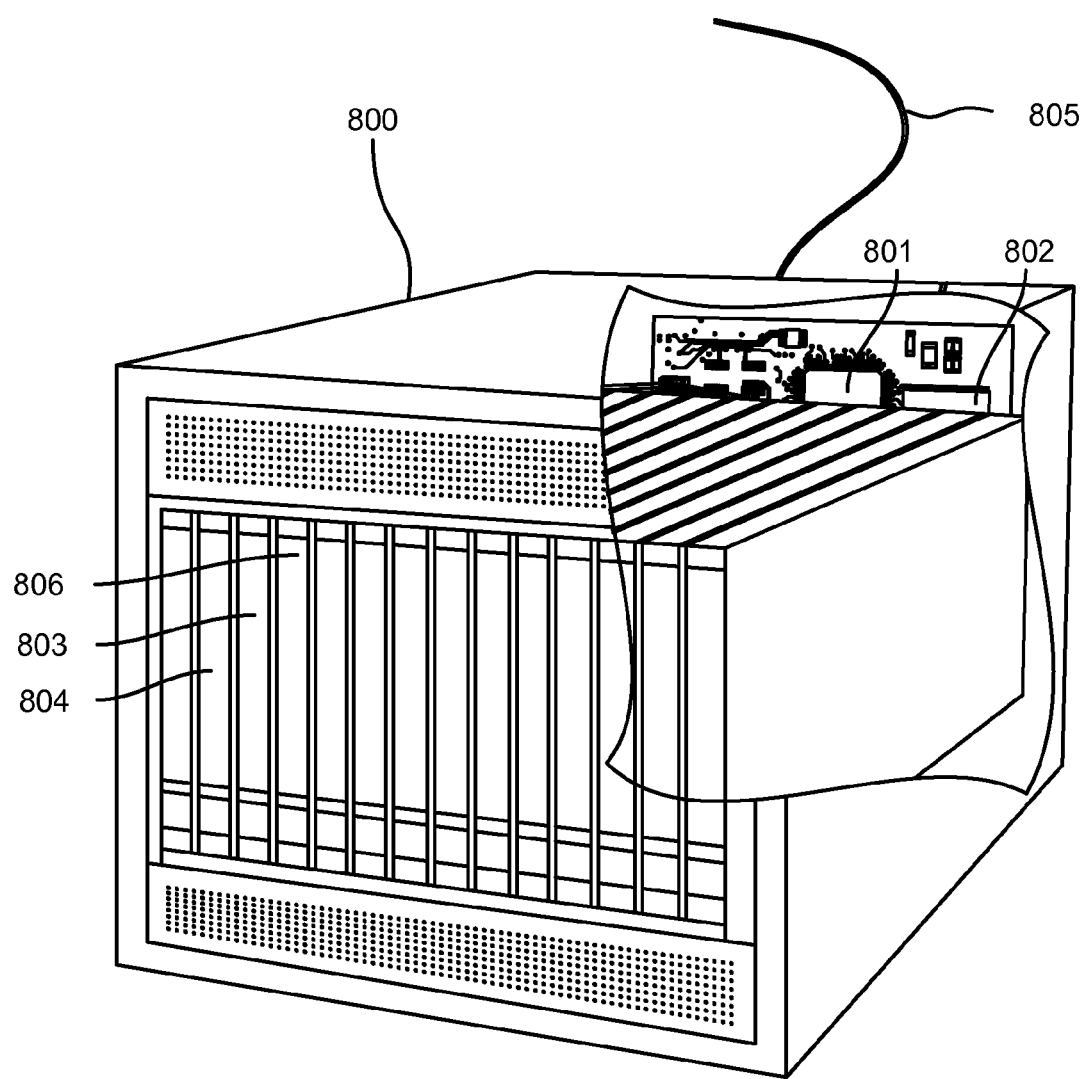
FIG. 8 is a component block diagram of a server device suitable for use in an aspect.

The aspects and network servers described above may be implemented in variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other communication system computers and servers.

The processors 702, 801, may be any programmable microprocessor, microcomputer or multiple processor chip or chips that can be configured by software instructions (applications) to perform a variety of functions, including the functions of the various aspects described below. In some mobile devices, multiple processors 702 may be provided, such as one processor dedicated to wireless communication functions and one processor dedicated to running other applications. Typically, software applications may be stored in the internal memory 704, 802, before they are accessed and loaded into the processor 902, 801. The processor 702, 801 may include internal memory sufficient to store the application software instructions. In some servers, the processor 801 may include internal memory sufficient to store the application software instructions. In some receiver devices, the secure memory may be in a separate memory chip coupled to the processor 801. The internal memory 704, 802 may be a volatile or nonvolatile memory, such as flash memory, or a mixture of both. For the purposes of this description, a general reference to memory refers to all memory accessible by the processor 702, 801, including internal memory 704, 802, removable memory plugged into the device, and memory within the processor 702, 801 itself.

Many modern computing are resource constrained systems that have relatively limited processing, memory, and energy resources. For example, a mobile device is a complex and resource constrained computing device that includes many features or factors that could contribute to its degradation in performance and power utilization levels over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of these complex yet resource-constrained systems. As such, it is difficult for users, operating systems, or application programs (e.g., antivirus software, etc.) to accurately and efficiently identify the sources of such problems. As a result, mobile device users currently have few remedies for preventing the degradation in performance and power utilization levels of a mobile device over time, or for restoring an aging mobile device to its original performance and power utilization levels.

The various aspects discussed in this application are especially well suited for use in resource constrained-computing devices, such as mobile devices, because they do not require evaluating a very large corpus of behavior information, generate classifier/behavior models dynamically to account for device-specific or application-specific features of the computing device, intelligently prioritize the features that are tested/evaluated by the classifier/behavior models, are not limited to evaluating an individual application program or process, intelligently identify the factors or behaviors that are to be monitored by the computing device, accurately and efficiently classify the monitored behaviors, and/or do not require the execution of computationally-intensive processes. For all these reasons, the various aspects may be implemented or performed in a resource-constrained computing device without having a significant negative and/or user-perceivable impact on the responsiveness, performance, or power consumption characteristics of the device.

For example, modern mobile devices are highly configurable and complex systems. As such, the factors or features that are most important for determining whether a particular device behavior is benign or not benign (e.g., malicious or performance-degrading) may be different in each mobile device. Further, a different combination of factors/features may require monitoring and/or analysis in each mobile device in order for that device to quickly and efficiently determine whether a particular behavior is benign or not benign. Yet, the precise combination of factors/features that require monitoring and analysis, and the relative priority or importance of each feature or feature combination, can often only be determined using device-specific information obtained from the specific computing device in which the behavior is to be monitored or analyzed. For these and other reasons, classifier models generated in any computing device other than the specific device in which they are used cannot include information that identifies the precise combination of factors/features that are most important to classifying a software application or device behavior in that specific device. That is, by generating classifier models in the specific computing device in which the models are used, the various aspects generate improved models that better identify and prioritize the factors/features that are most important for determining whether a software application, process, activity or device behavior is benign or non-benign.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing a behavior-based security system of a mobile device, comprising:
generating by a processor artificial attack software configured to simulate a non-benign behavior in the mobile device;

sending the generated artificial attack software to the mobile device so as to simulate the non-benign behavior in the mobile device;

receiving behavior information from the mobile device in response to sending the generated artificial attack software to the mobile device;

generating a behavior vector based on the received behavior information;

applying the generated behavior vector to a classifier model to generate a result;

using the generated result to determine whether the behavior-based security system of the mobile device responded adequately to the simulated non-benign behavior; and sending a dead-man signal to the mobile device in response to determining that the behavior-based security system of the mobile device did not respond adequately to the simulated non-benign behavior.

2. The method of claim 1, further comprising setting a timer by the processor, wherein determining whether the behavior-based security system of the mobile device responded adequately to the simulated non-benign behavior comprises determining whether a response was received from the mobile device before expiration of the timer.

3. The method of claim 1, further comprising sending a system-ok signal to the mobile device in response to determining that the behavior-based security system of the mobile device responded adequately to the simulated non-benign behavior.

4. The method of claim 1, wherein sending the dead-man signal to the mobile device comprises sending a communication message that includes information suitable for causing the mobile device to perform dead-man operations.

5. The method of claim 1, wherein generating the artificial attack software comprises:
receiving a corpus of behavior information from many mobile devices;
analyzing the corpus of behavior information to identify the non-benign behavior; and
generating the artificial attack software to include information suitable for causing a mobile device processor of the mobile device to perform the identified non-benign behavior.

6. The method of claim 1, wherein generating the artificial attack software comprises generating the artificial attack software to include information suitable for causing a mobile device processor of the mobile device to perform operations associated with a known cyber attack.

7. The method of claim 1, further comprising:
receiving the artificial attack software in a mobile device processor of the mobile device;
installing the received artificial attack software in the mobile device;
monitoring operations of the behavior-based security system to collect behavior information; and
sending collected behavior information to the processor.

8. The method of claim 7, further comprising:
setting by the mobile device processor a timer in response to sending the collected behavior information; and
performing by the mobile device processor dead-man operations in response to determining that a system-ok signal has not been received by the mobile device and that the timer has expired.

9. The method of claim 1, wherein the simulated non-benign behavior includes simulated behaviors of a near-field communication (NFC) transaction, and wherein the dead-man signal includes information suitable for causing the mobile device to prevent completion of an near field communication (NFC) transaction.

10. A computing device, comprising:
a processor configured with processor-executable instructions to perform operations comprising:
generating artificial attack software configured to simulate a non-benign behavior in a mobile device;
sending the generated artificial attack software to the mobile device so as to simulate the non-benign behavior in the mobile device;
receiving behavior information from the mobile device in response to sending the generated artificial attack software to the mobile device;
generating a behavior vector based on the received behavior information;
applying the generated behavior vector to a classifier model to generate a result;
using the generated result to determine whether a behavior-based security system of the mobile device responded adequately to the simulated non-benign behavior; and
sending a dead-man signal to the mobile device in response to determining that the behavior-based security system of the mobile device did not respond adequately to the simulated non-benign behavior.

11. The computing device of claim 10, wherein:
the processor is configured with processor-executable instructions to perform operations further comprising setting a timer by the processor, and
the processor is configured with processor-executable instructions to perform operations such that determining whether the behavior-based security system of the mobile device responded adequately to the simulated non-benign behavior comprises determining whether a response was received from the mobile device before expiration of the timer.

12. The computing device of claim 10, wherein the processor is configured with processor-executable instructions to perform operations further comprising sending a system-ok signal to the mobile device in response to determining that the behavior-based security system of the mobile device responded adequately to the simulated non-benign behavior.

13. The computing device of claim 10, wherein the processor is configured with processor-executable instructions to perform operations such that sending the dead-man signal to the mobile device comprises sending a communication message that includes information suitable for causing the mobile device to perform dead-man operations.

14. The computing device of claim 10, wherein the processor is configured with processor-executable instructions to perform operations such that generating artificial attack software comprises:
receiving a corpus of behavior information from many mobile devices;
analyzing the corpus of behavior information to identify the non-benign behavior; and
generating artificial attack software to include information suitable for causing a mobile device processor of the mobile device to perform the identified non-benign behavior.

15. The computing device of claim 10, wherein the processor is configured with processor-executable instructions to perform operations such that generating artificial attack software comprises generating artificial attack software to include information suitable for causing a mobile device processor of the mobile device to perform operations associated with a known cyber attack.

16. A non-transitory computer readable storage medium having stored thereon processor-executable software instructions configured to cause a processor to perform operations for analyzing a behavior-based security system of a mobile device, the operations comprising:
   generating artificial attack software configured to simulate a non-benign behavior in the mobile device;
   sending the generated artificial attack software to the mobile device so as to simulate the non-benign behavior in the mobile device;
   receiving behavior information from the mobile device in response to sending the generated artificial attack software to the mobile device;
   generating a behavior vector based on the received behavior information;
   applying the generated behavior vector to a classifier model to generate a result;
   using the generated result to determine whether the behavior-based security system of the mobile device responded adequately to the simulated non-benign behavior; and
   sending a dead-man signal to the mobile device in response to determining that the behavior-based security system of the mobile device did not respond adequately to the simulated non-benign behavior.

17. The non-transitory computer readable storage medium of claim 16, wherein the stored processor-executable software instructions are configured to cause a processor to perform operations further comprising setting a timer by the processor, wherein determining whether the behavior-based security system of the mobile device responded adequately to the simulated non- benign behavior comprises determining whether a response was received from the mobile device before expiration of the timer.

18. The non-transitory computer readable storage medium of claim 16, wherein the stored processor-executable software instructions are configured to cause a processor to perform operations further comprising sending a system-ok signal to the mobile device in response to determining that the behavior-based security system of the mobile device responded adequately to the simulated non-benign behavior.

19. The non-transitory computer readable storage medium of claim 16, wherein the stored processor-executable software instructions are configured to cause a processor to perform operations such that sending the dead-man signal to the mobile device comprises sending a communication message that includes information suitable for causing the mobile device to perform dead-man operations.

20. The non-transitory computer readable storage medium of claim 16, wherein the stored processor-executable software instructions are configured to cause a processor to perform operations such that generating artificial attack software comprises:
   receiving a corpus of behavior information from many mobile devices;
   analyzing the corpus of behavior information to identify the non-benign behavior; and
   generating artificial attack software to include information suitable for causing a mobile device processor of the mobile device to perform the identified non-benign behavior.

21. The non-transitory computer readable storage medium of claim 16, wherein the stored processor-executable software instructions are configured to cause a processor to perform operations such that generating artificial attack software comprises generating artificial attack software to include information suitable for causing a mobile device processor of the mobile device to perform operations associated with a known cyber attack.

22. A computing device, comprising:
   means for generating artificial attack software configured to simulate a non-benign behavior in a mobile device;
   means for sending the generated artificial attack software to the mobile device so as to simulate the non-benign behavior in the mobile device;
   means for receiving behavior information from the mobile device in response to sending the generated artificial attack software to the mobile device;
   means for generating a behavior vector based on the received behavior information;
   means for applying the generated behavior vector to a classifier model to generate a result;
   means for using the generated result to determine whether a behavior-based security system of the mobile device responded adequately to the simulated non-benign behavior; and
   means for sending a dead-man signal to the mobile device in response to determining that the behavior-based security system of the mobile device did not respond adequately to the simulated non-benign behavior.

23. The computing device of claim 22, further comprising means for setting a timer, wherein means for determining whether the behavior-based security system of the mobile device responded adequately to the simulated non-benign behavior comprises means for determining whether a response was received from the mobile device before expiration of the timer.

24. The computing device of claim 22, further comprising means for sending a system-ok signal to the mobile device in response to determining that the behavior-based security system of the mobile device responded adequately to the simulated non-benign behavior.

25. The computing device of claim 22, wherein means for sending the dead-man signal to the mobile device comprises sending a communication message that includes information suitable for causing the mobile device to perform dead-man operations.

26. The computing device of claim 22, wherein means for generating artificial attack software comprises:
   means for receiving a corpus of behavior information from many mobile devices;
   means for analyzing the corpus of behavior information to identify the non-benign behavior; and
   means for generating artificial attack software to include information suitable for causing a mobile device processor of the mobile device to perform the identified non-benign behavior.

* * * * *